US009290338B2

(12) United States Patent
Martin et al.

(10) Patent No.: US 9,290,338 B2
(45) Date of Patent: *Mar. 22, 2016

(54) APPARATUSES AND METHODS FOR DISPENSING MAGNETIC CARDS, INTEGRATED CIRCUIT CARDS, AND OTHER SIMILAR ITEMS

(75) Inventors: Douglas A. Martin, Woodinville, WA (US); Scott A. Dean, Issaquah, WA (US); Mark L. Waechter, Winthrop, WA (US); Gregory P. Winters, Snohomish, WA (US)

(73) Assignee: Outerwall Inc., Bellevue, WA (US)

( * ) Notice: Subject to any disclaimer, the term of this patent is extended or adjusted under 35 U.S.C. 154(b) by 891 days.

This patent is subject to a terminal disclaimer.

(21) Appl. No.: 12/877,261

(22) Filed: Sep. 8, 2010

(65) Prior Publication Data

US 2010/0327005 A1    Dec. 30, 2010

Related U.S. Application Data

(63) Continuation of application No. 10/995,032, filed on Nov. 22, 2004, now Pat. No. 7,815,071, which is a continuation of application No. 10/367,110, filed on Feb. 14, 2003, now Pat. No. 6,957,746.

(60) Provisional application No. 60/357,519, filed on Feb. 15, 2002.

(51) Int. Cl.
*B65D 83/08* (2006.01)
*B65H 1/06* (2006.01)
(Continued)

(52) U.S. Cl.
CPC .. *B65H 1/06* (2013.01); *B65H 1/28* (2013.01); *B65H 3/24* (2013.01); *B65H 3/44* (2013.01);
(Continued)

(58) Field of Classification Search
CPC .......................................................... B65H 1/06
USPC ........................................... 221/92, 131, 133
See application file for complete search history.

(56) References Cited

U.S. PATENT DOCUMENTS 3,655,092 A    4/1972  Hall et al.
3,757,917 A    9/1973  Waiwood et al.
(Continued)

FOREIGN PATENT DOCUMENTS

DE    3147603    6/1983
EP    0313294    4/1989
(Continued)

OTHER PUBLICATIONS

U.S. Appl. No. 12/795,799, filed Jun. 8, 2010, Martin et al.
(Continued)

*Primary Examiner* — Stefanos Karmis
*Assistant Examiner* — Michael E Butler
(74) *Attorney, Agent, or Firm* — Perkins Coie LLP

(57) ABSTRACT

Apparatuses and methods for dispensing cards and other items. In one embodiment, a card dispensing apparatus includes at least first and second card hoppers and a movable card carriage. The card carriage is movable between a first position proximate to the first card hopper and a second position proximate to the second card hopper. The card carriage is configured to receive a first card from the first card hopper when in the first position and a second card from the second card hopper when in the second position. In one aspect of this embodiment, the card carriage can dispense at least the first card into a card outlet chute when the first card has been sufficiently read by a card reader. Alternatively, the card carriage can dispense the first card into a card escrow chute when the first card has not been sufficiently read by the card reader.

13 Claims, 12 Drawing Sheets

(51) Int. Cl.
  *B65H 1/28* (2006.01)
  *B65H 3/24* (2006.01)
  *B65H 3/44* (2006.01)
  *G06K 13/103* (2006.01)
  *G07F 11/04* (2006.01)
  *G07F 11/24* (2006.01)

(52) U.S. Cl.
  CPC ............ *G06K 13/103* (2013.01); *G07F 11/045* (2013.01); *G07F 11/24* (2013.01); *B65H 2301/42322* (2013.01); *B65H 2403/46* (2013.01); *B65H 2405/3311* (2013.01); *B65H 2701/1914* (2013.01)

(56) References Cited

U.S. PATENT DOCUMENTS

| | | | |
|---|---|---|---|
| 3,947,118 A | 3/1976 | Amort | |
| 3,999,747 A | 12/1976 | Reittinger et al. | |
| 4,252,250 A | 2/1981 | Toth | |
| 4,322,067 A | 3/1982 | Masselin et al. | |
| 4,687,119 A | 8/1987 | Juillet | |
| 4,825,054 A * | 4/1989 | Rust et al. | |
| 5,010,997 A | 4/1991 | Matsuo et al. | |
| 5,106,260 A | 4/1992 | Obrecht | |
| 5,176,237 A | 1/1993 | Yang | |
| 5,271,628 A | 12/1993 | Okada | |
| 5,350,906 A | 9/1994 | Brody et al. | |
| 5,365,046 A | 11/1994 | Haymann | |
| 5,368,286 A | 11/1994 | Horsman et al. | |
| 5,457,305 A | 10/1995 | Akel et al. | |
| 5,531,640 A | 7/1996 | Inoue | |
| 5,555,497 A | 9/1996 | Helbling | |
| 5,564,546 A | 10/1996 | Molbak et al. | |
| 5,577,959 A | 11/1996 | Takemoto et al. | |
| 5,584,589 A | 12/1996 | Adkins et al. | |
| 5,637,845 A | 6/1997 | Kolls | |
| 5,665,952 A | 9/1997 | Ziarno | |
| 5,699,328 A | 12/1997 | Ishizaki et al. | |
| 5,743,429 A | 4/1998 | Morofsky | |
| 5,746,299 A | 5/1998 | Molbak et al. | |
| 5,799,767 A | 9/1998 | Molbak | |
| 5,839,956 A | 11/1998 | Takemoto et al. | |
| 5,857,588 A | 1/1999 | Kasper | |
| 5,949,046 A * | 9/1999 | Kenneth et al. | 235/380 |
| 5,974,146 A | 10/1999 | Randle et al. | |
| 6,039,412 A | 3/2000 | Kazo et al. | |
| 6,102,248 A | 8/2000 | Yamamiya | |
| 6,105,009 A | 8/2000 | Cuervo | |
| 6,116,402 A | 9/2000 | Beach et al. | |
| 6,129,275 A | 10/2000 | Urquhart et al. | |
| 6,138,106 A | 10/2000 | Walker et al. | |
| 6,144,946 A | 11/2000 | Iwamura et al. | |
| 6,149,064 A * | 11/2000 | Yamaoka et al. | 235/479 |
| 6,185,545 B1 | 2/2001 | Resnick et al. | |
| 6,230,928 B1 | 5/2001 | Hanna et al. | |
| 6,233,564 B1 | 5/2001 | Schulze, Jr. | |
| 6,253,955 B1 | 7/2001 | Bower | |
| 6,289,324 B1 | 9/2001 | Kawan | |
| 6,318,536 B1 | 11/2001 | Korman et al. | |
| 6,405,182 B1 | 6/2002 | Cuervo | |
| 6,415,262 B1 | 7/2002 | Walker et al. | |
| 6,494,365 B1 | 12/2002 | Kozakai et al. | |
| 6,494,776 B1 | 12/2002 | Molbak | |
| 6,527,139 B2 | 3/2003 | Seagle | |
| 6,597,970 B1 | 7/2003 | Steury | |
| 6,659,259 B2 | 12/2003 | Knox et al. | |
| 6,786,355 B2 | 9/2004 | Chirnomas | |
| 6,805,286 B2 | 10/2004 | Hilton et al. | |
| 6,957,746 B2 | 10/2005 | Martin et al. | |
| 7,044,330 B2 | 5/2006 | Chirnomas | |
| 7,044,332 B2 | 5/2006 | Giegerich et al. | |
| 7,128,261 B1 | 10/2006 | Henderson et al. | |
| 7,156,300 B1 | 1/2007 | Dentlinger | |
| 7,195,113 B2 | 3/2007 | Furneaux | |
| 7,255,268 B2 | 8/2007 | Dentlinger | |
| 7,377,507 B2 | 5/2008 | Yamamiya | |
| 7,520,374 B2 | 4/2009 | Martin et al. | |
| 7,653,599 B2 | 1/2010 | Doran et al. | |
| 7,677,565 B2 | 3/2010 | Grauzer et al. | |
| 7,685,432 B2 | 3/2010 | Mochizuki | |
| 7,726,645 B2 | 6/2010 | Gerlier et al. | |
| 7,748,619 B2 | 7/2010 | Martin et al. | |
| 7,764,836 B2 | 7/2010 | Downs, III et al. | |
| 7,815,071 B2 * | 10/2010 | Martin et al. | 221/92 |
| 7,865,432 B2 | 1/2011 | Doran et al. | |
| 7,874,478 B2 | 1/2011 | Molbak | |
| 7,967,191 B1 | 6/2011 | Enright et al. | |
| 8,028,989 B2 | 10/2011 | Kitagawa et al. | |
| 8,033,375 B2 | 10/2011 | Doran et al. | |
| 8,131,398 B2 | 3/2012 | Fan et al. | |
| 8,332,313 B2 | 12/2012 | Doran et al. | |
| 8,550,294 B2 | 10/2013 | Martin | |
| 2002/0026423 A1 | 2/2002 | Maritzen et al. | |
| 2006/0207856 A1 | 9/2006 | Dean et al. | |
| 2007/0125620 A1 | 6/2007 | Sorenson et al. | |
| 2008/0162299 A1 | 7/2008 | Gusler et al. | |
| 2008/0164279 A1 | 7/2008 | Chirnomas et al. | |
| 2008/0203157 A1 | 8/2008 | Thorsen et al. | |
| 2009/0045255 A1 | 2/2009 | Adams | |
| 2011/0071666 A1 | 3/2011 | Martin et al. | |
| 2013/0086973 A1 | 4/2013 | Martin et al. | |
| 2014/0263385 A1 | 9/2014 | Martin | |

FOREIGN PATENT DOCUMENTS

| | | |
|---|---|---|
| EP | 0857579 A2 | 8/1998 |
| EP | 1178448 | 2/2002 |
| GB | 2188467 | 9/1987 |
| JP | 1246698 A | 10/1989 |
| JP | 363795 | 3/1991 |
| JP | 2000094871 | 4/2000 |
| WO | WO-9950785 | 10/1999 |

OTHER PUBLICATIONS

U.S. Appl. No. 12/940,541, filed Nov. 5, 2010, Martin et al.
International Search Report, International Application No. PCT/US03/04799, dated Jul. 4, 2003, 8 pages.
Sheehan, Michael, "Marriage of Convenience," http://www.kioskbusiness.com/NovDec01/articles/article4.html [accessed May 16, 2003], 3 pages.
Tranax Technologies, Inc., "Card Dispenser," 2007, <http://www.tranax.com/products/self-service_products/accessories/index.cfm?product=carddisp>, [internet accessed on Aug. 11, 2009], 1 page.
Notice of Allowance in U.S. Appl. No. 13/803,559 Mail Date Sep. 2, 2015, 5 pages.

* cited by examiner

APPARATUSES AND METHODS FOR DISPENSING MAGNETIC CARDS, INTEGRATED CIRCUIT CARDS, AND OTHER SIMILAR ITEMS

CROSS-REFERENCE TO RELATED APPLICATIONS

This application is a continuation of U.S. patent application Ser. No. 10/995,032, filed Nov. 22, 2004, which is a continuation of U.S. patent application Ser. No. 10/367,110, filed Feb. 14, 2003, now U.S. Pat. No. 6,957,746, which claims priority to U.S. Provisional Patent Application No. 60/357,519, filed Feb. 15, 2002, which applications are incorporated herein in their entireties by reference.

TECHNICAL FIELD

The following disclosure relates generally to apparatuses and methods for dispensing cards and, more particularly, to apparatuses and methods for dispensing multiple types of wallet-sized cards.

BACKGROUND

Various vending machines exist for dispensing prepaid credit cards, phone cards, and other types of wallet-sized cards to consumers. Such machines typically include a card selector, a credit card reader and/or a bill acceptor, and a card outlet. In use, a consumer selects a desired card with the selector and deposits the required funds via the bill acceptor or the credit card reader. Once the machine has confirmed receipt of the funds, a card dispenser housed within the machine dispenses the desired card to the consumer via the card outlet.

FIG. 1 is an isometric view of a card dispenser 100 configured in accordance with the prior art. The card dispenser 100 includes a card hopper 102 containing a plurality of cards 101, a card conveyor 104, a card reader 106, and a card outlet 108. In a typical vending machine application, the card dispenser 100 would be housed within the machine so only the card outlet 108 would be exposed. In operation, after a user has selected a card for purchase and deposited the required funds, the card conveyor 104 removes the bottom-most card 101 from the hopper 102 and moves the card forward past the card reader 106. As the card moves past the card reader 106, the card reader 106 reads information off of a magnetic stripe on the card. Such information can include a unique code for associating the card with a particular account. For example, if the card is a prepaid credit card, then the code can be associated with a specific credit card account. Similarly, if the card is a prepaid phone card, then the code can be associated with a specific long-distance account. After moving past the card reader 106, the card conveyor 104 pushes the card through the card outlet 108 to be picked up by the user.

One shortcoming of the prior art card dispenser 100 is that it can only dispense a single type of card. As a result, additional card dispensers are required if more than one type of card is to be dispensed from a particular vending machine. Adding additional card dispensers, however, unfavorably increases the cost, size, and weight of a vending machine. In addition, multiple card dispensers can increase the risk of card theft through the additional card outlets.

SUMMARY

The invention is directed to apparatuses and methods for dispensing prepaid credit cards, phone cards, gift cards, stored-value cards, and other similar items. In one aspect of the invention, a card dispensing apparatus includes at least first and second card hoppers, and a card carriage selectively movable between a first position proximate to the first card hopper and a second position proximate to the second card hopper. The card carriage is configured to receive at least a first card from the first card hopper when the card carriage is in the first position. The card carriage is further configured to receive at least a second card from the second card hopper when the card carriage is in the second position. In another aspect of the invention, the card dispensing apparatus can include a card reader/writer configured to read/write information from/to the first and second cards as they are being removed from their respective hoppers.

In a further aspect of the invention, the card dispensing apparatus can also include a card outlet passage in communication with a card outlet, and a card escrow passage in communication with a card escrow bin. The card carriage can be configured to dispense cards into the card outlet passage when the card reader/writer has sufficiently read information from the cards. The card carriage can be further configured to dispense cards into the card escrow passage when the card reader/writer has not sufficiently read information from the cards.

In yet another aspect of the invention, a method for dispensing at least first and second card types from an enclosure can include placing a first plurality of cards of the first type at a first location within the enclosure, and placing a second plurality of cards of the second type at a second location within the enclosure. In response to a first request for a card of the first type, the method can include positioning a card carriage at least proximate to the first location, removing a first card from the first location with the card carriage, and dispensing the first card to a card outlet with the card carriage. In response to a second request for a card of the second type, the method can further include positioning the card carriage at least proximate to the second location, removing a second card from the second location with the card carriage, and dispensing the second card to the card outlet with the card carriage.

DETAILED DESCRIPTION

Figure 1:
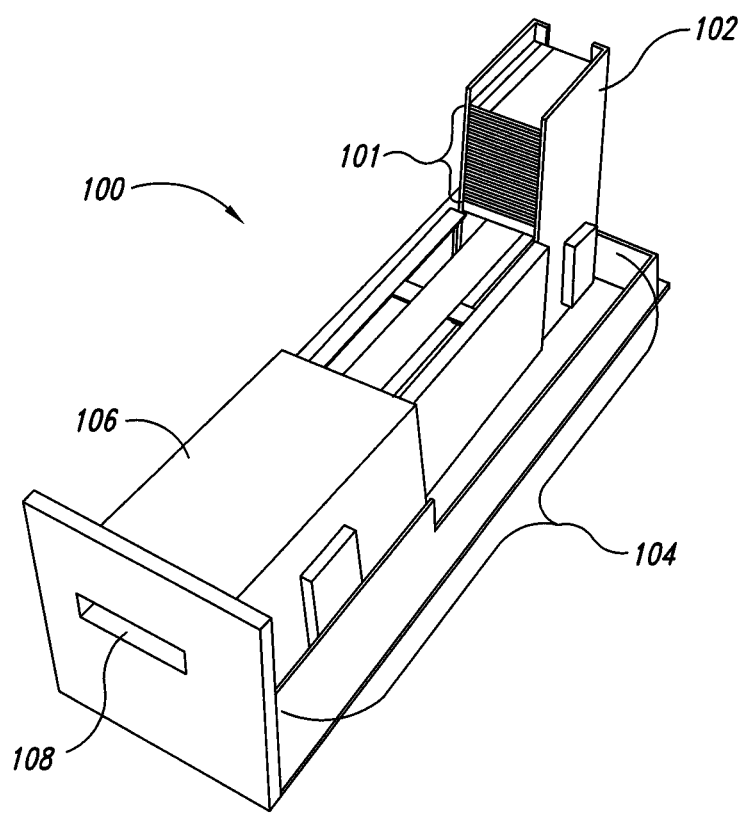
FIG. 1 is an isometric view of a card dispenser configured in accordance with the prior art.

The following disclosure describes apparatuses and methods for dispensing credit cards, phone cards, and other similar items from vending machines, kiosks, or other enclosures. In some embodiments, the apparatuses and methods disclosed can include features for reading information from, and writing information to, media fixed to cards. Such media can include, for example, magnetic stripes complying with one or more International Standards Organization (ISO) standards, memory chips embedded in integrated circuit (IC) cards, bar codes, and radio frequency tags, among others.

Certain embodiments of the apparatuses and methods described herein are described in the context of computer-executable instructions performed by a general-purpose computer. In one embodiment, these computer-executable instructions can be stored on a computer-readable medium, such as a floppy disk or CD-ROM. In other embodiments, these instructions can be stored on a server computer system and accessed via a communications link or a computer network, such as an intranet, the Internet, or other computer network. Because the basic structures and functions related to computer-readable routines and corresponding implementations are known, they have not been shown or described in detail here to avoid unnecessarily obscuring the described embodiments.

Certain specific details are set forth in the following description and in FIGS. 2A-8 to provide a thorough understanding of various embodiments of the invention. Those of ordinary skill in the relevant art will understand, however, that the invention may have additional embodiments that may be practiced without several of the details described below. In addition, some well-known structures and systems often associated with card dispensing apparatuses and methods have not been shown or described in detail below to avoid unnecessarily obscuring the description of the various embodiments of the invention.

In the drawings, identical reference numbers identify identical or at least generally similar elements. To facilitate the discussion of any particular element, the most significant digit or digits in any reference number refers to the figure in which that element is first introduced. For example, element 390 is first introduced and discussed with reference to FIG. 3. In addition, any dimensions, angles, and other specifications shown in the figures are merely illustrative of particular embodiments of the invention. Accordingly, other embodiments of the invention can have other dimensions, angles, and specifications without departing from the spirit or scope of the present disclosure.

Figure 2A:
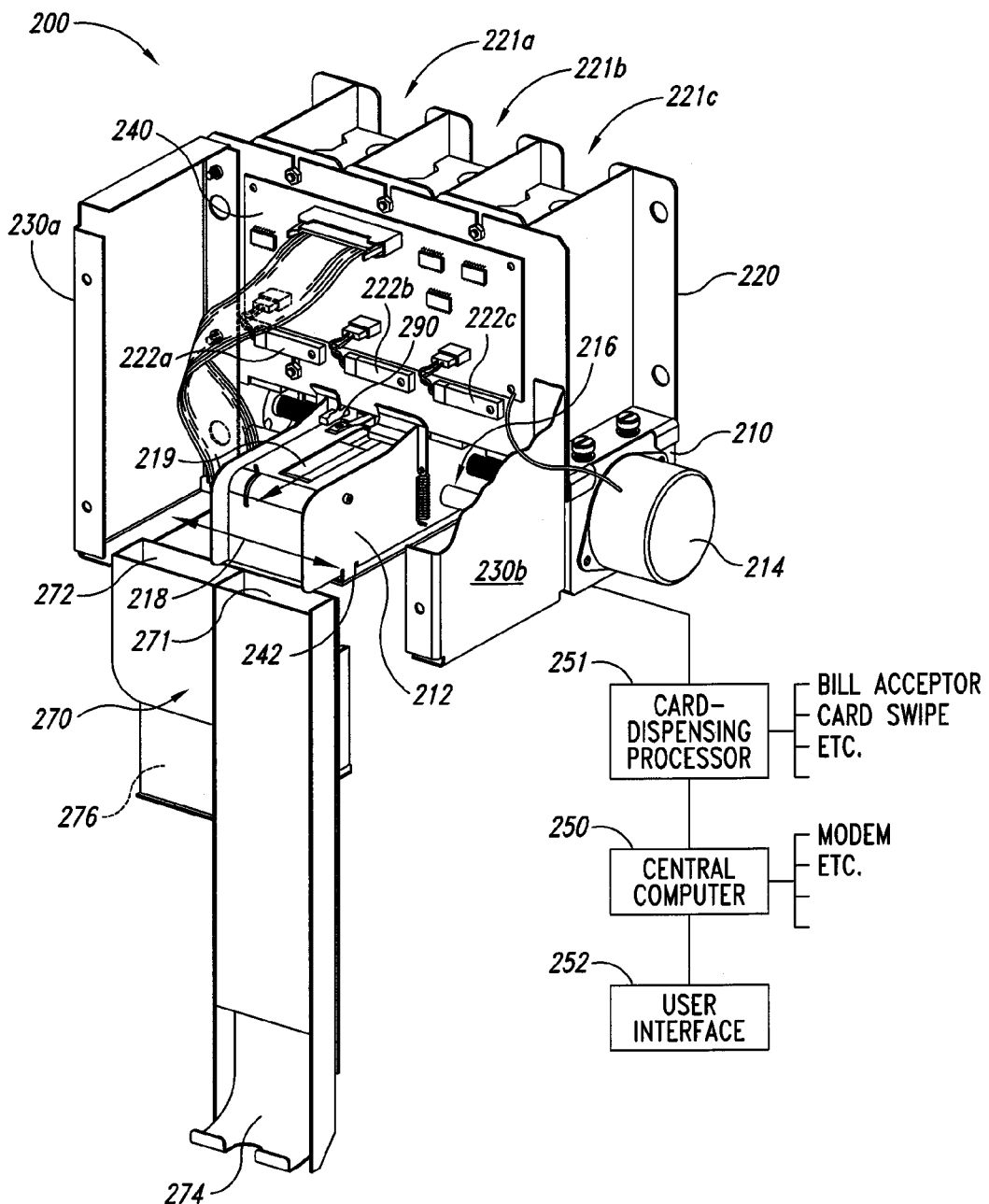
FIG. 2A is a partially schematic front isometric view of a card dispensing apparatus configured in accordance with an embodiment of the invention.
Figure 2B:
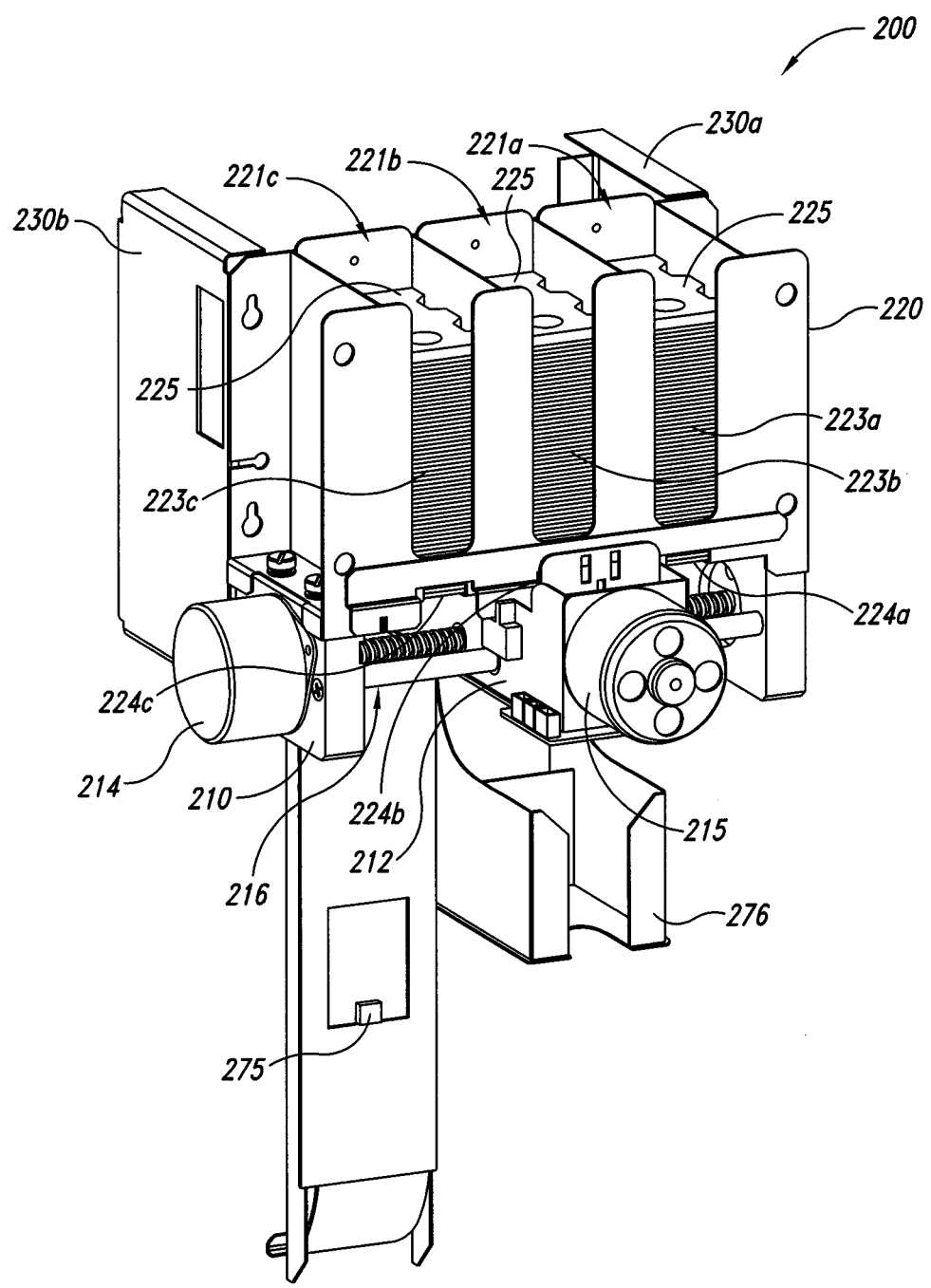
FIG. 2B is a rear isometric view of the card dispensing apparatus of FIG. 2A.

FIG. 2A is a partially schematic front isometric view of a card dispensing apparatus 200 configured in accordance with an embodiment of the invention. FIG. 2B is a rear isometric view of the card dispensing apparatus 200 of FIG. 2A. Referring to FIGS. 2A and 2B together, in one aspect of this embodiment, the card dispensing apparatus 200 includes a card hopper assembly 220 having a plurality of card hoppers 221 (shown as a first card hopper 221a, a second card hopper 221b, and a third card hopper 221c). In another aspect of this embodiment, the card dispensing apparatus 200 further includes a card carriage assembly 210 positioned beneath the card hopper assembly 220. As described in greater detail below, the card carriage assembly 210 includes a movable card carriage 212 that can move back and forth along a first axis 218 to selectively receive the bottom-most card from any one of the three card hoppers 221a-c. In a further aspect of this embodiment, the card dispensing apparatus 200 also includes a card passage or chute assembly 270 configured to receive cards from the card carriage 212 and deliver the cards to one of a card holding or escrow bin 276 or a card outlet 274. Mounting brackets 230 (shown as a first mounting bracket 230a and a partially cutaway second mounting bracket 230b in FIG. 2A) can be used to mount the card dispensing apparatus 200 to the inside of a vending machine or other enclosure so the card outlet 274 is adjacent to an opening that is accessible to a user.

Referring to FIG. 2B, each card hopper 221 can be configured to hold a card stack 223 (shown as a first card stack 223a, a second card stack 223b, and a third card stack 223c in FIG. 2B). Weights 225 can be positioned on top of the card stacks 223 to compress the cards and facilitate sequential removal of the bottom-most cards from the card hoppers 221 by the card carriage 212. Although the illustrated embodiment depicts three card hoppers 221a-c, in other embodiments the card hopper assembly 220 can include more or fewer card hoppers. For example, in another embodiment, the card hopper assembly 220 can include two card hoppers. In a further embodiment, the card hopper assembly 220 can include between four and six card hoppers. In yet another embodiment, the card hopper assembly 220 can include seven or more card hoppers.

Each card hopper 221 can include an open bottom slot 224 (shown as a first slot 224a, a second slot 224b, and a third slot 224c in FIG. 2B) through which a portion of the card carriage 212 can extend to engage and remove the bottom-most card. Each card hopper 221 can further include a card level sensor 222 (shown as a first card level sensor 222a, a second card level sensor 222b, and a third card level sensor 222c in FIG. 2A) positioned toward a bottom portion of the card hopper 221. The card level sensors 222 can sense the card levels in their respective card hoppers 221 and transmit a signal when their respective card hoppers 221 are in need of a refill.

In another aspect of this embodiment, each card stack 223 can include a different type of card. For example, in one embodiment, the first card stack 223a can include prepaid credit cards, the second card stack 223b can include prepaid phone cards, and the third card stack 223 can include prepaid gift cards. Such cards commonly include fixed data storage media, such as magnetic stripes, integrated circuits, and/or bar codes. In other embodiments, other types of cards can be included in the card stacks 223. For example, in another embodiment, optical memory cards can be included in one or more of the card stacks 223. In further embodiments, the card stacks 223 can include other items such as event tickets, electronic pass-key cards, transit pass cards, identification cards, and the like without departing from the spirit or scope of the present disclosure.

In a further aspect of this embodiment, the carriage assembly 210 is releasably fixed to the bottom of the card hopper assembly 220, and includes a first stepper motor 214 and a carriage track 216 extending beneath the card hoppers 221. The first stepper motor 214 controls movement of the card carriage 212 back and forth on the carriage track 216 parallel to the first axis 218, and can selectively position the card carriage 212 under any one of the three card hoppers 221a-c as required for card removal. As described in greater detail below, in another aspect of this embodiment, the card carriage 212 is configured to extract or remove the bottom-most card from the respective card hopper 221 and move the card forward parallel to a second axis 219. As the card carriage 212 moves the extracted card forward, a card reader/writer 290 associated with the card carriage 212 can, depending on the type of card, read information off of the card (e.g., off of a magnetic stripe or bar code fixed to the card) and/or write information to the card (e.g., to a memory chip or magnetic stripe fixed to the card). In the illustrated embodiment, the card reader/writer 290 is attached to the card carriage 212. In other embodiments, however, other card reader/writer configurations can be used. For example, in one other embodiment, each card hopper 221 can have an associated card reader/writer that reads the cards as they are removed from the respective hopper 221. In yet other embodiments, card reader/writers can be attached to other portions of the card dispensing apparatus 200 without departing from the present disclosure.

After the card carriage 212 has fully extracted the card from the respective card hopper 221, the card carriage 212 moves along the first axis 218 into position above the card chute assembly 270. Once in position above the appropriate chute, the card carriage 212 drops the card into the chute.

In the illustrated embodiment, the card carriage 212 is configured to "receive" the bottom-most cards from the card hoppers 221 by removing the bottom-most cards from the card hoppers 221. In other embodiments, the card carriage 212 can be configured to receive the bottom-most cards from the card hoppers 221 in other ways. For example, in one other embodiment, the card hoppers 221 can include card dispensing features configured to eject the bottom-most card (or other card) onto the card carriage 212 when the card carriage 212 is adjacent the respective card hopper 221. Accordingly, in yet other embodiments, other methods can be used to move cards from the card hoppers 221 and onto the card carriage 212, without departing from the spirit or scope of the present invention.

In yet another aspect of this embodiment, the card chute assembly 270 includes a card outlet passage or card outlet chute 271, and a card escrow passage or card escrow chute 272. The card outlet chute 271 is configured to receive cards from the card carriage 212 that are acceptable for distribution and to deliver such cards to the card outlet 274. As described in greater detail below, in one embodiment, the card outlet 274 can be positioned on the front of a vending machine or other enclosure in which the card dispensing apparatus 200 is housed so that users can easily retrieve the cards they purchase. As shown in FIG. 2B, a card dispensing sensor 275 can be positioned adjacent to the card outlet chute 271 to sense when a card has been dispensed to a user. Such information can be useful to detect a jam or other malfunction in the system that prohibits cards from being transferred to the card outlet 274. In a further aspect of this embodiment, the card escrow chute 272 can be configured to receive cards from the card carriage 212 that are unacceptable for distribution and to deliver such cards to the card escrow bin 276 for subsequent recycling or disposal by an operator of the card dispensing apparatus 200.

The card outlet chute 271 and the card escrow chute 272 of the illustrated embodiment are but one possible configuration of card passages that may be employed consistent with the present disclosure. In other embodiments, these passages may extend in other directions to dispense cards to users or to holding bins, as the case may be, or these passages may be at least partially automated with mechanized conveyances for moving cards. In yet further embodiments, these passages can be omitted and the cards can be dispensed directly from the card carriage 212 to an adjacent outlet slot or, conversely, to an adjacent holding bin.

Based on the foregoing, if a card is properly read or written to with the card reader/writer 290 during extraction from one of the card hoppers 221 (and hence is an acceptable card), then the card carriage 212 drops the card into the card outlet chute 271 for delivery to a user via the card outlet 274. If instead the card is improperly read or written to with the card reader/writer 290 (and hence is an unacceptable card), then the card carriage 212 drops the card into the card escrow chute 272 for delivery to the card escrow bin 276. One advantage of this feature is that it avoids the cost and inconvenience associated with distributing defective cards to users. Another advantage of this feature is that the card outlet 274 is vertically offset from the card carriage 212, making it difficult for a person to gain access to the cards stored in the card hoppers 221 by inserting a hand or elongated device into the card outlet 274. In other embodiments, however, the card outlet chute 271 can be omitted and the card carriage 212 can be at least partially alignable with a card outlet slot or other similar type of opening. In these embodiments, the card carriage 212 can dispense acceptable cards by simply ejecting them forward through the aligned outlet slot.

In a further aspect of this embodiment, the card dispensing apparatus 200 includes a carriage controller 240 and a card data processor 242 operatively connected to a "data funnel" or card dispensing processor 251 (shown schematically in FIG. 2A). The card data processor 242 can be mounted to the underside of the card carriage 212 and can be operatively connected to the card reader/writer 290. Accordingly, the card data processor 242 can be configured to receive data that has been read from a card by the card reader/writer 290. In addition, the card data processor 242 can be further configured to transfer data from the card dispensing processor 251 to the card reader/writer 290 for writing to a card by the card reader/writer 290. The carriage controller 240 can be mounted to the card hopper assembly 220 and can be operatively connected to the card carriage 212. The carriage controller 240 can control movement of the card carriage 212 back and forth along the carriage track 216 via the first stepper motor 214. In addition, the carriage controller 240 can control card removal by the card carriage 212 via a second stepper motor 215 mounted to an aft end of the card carriage 212.

The card dispensing processor 251 can be mounted adjacent to the card hopper assembly 220 in vending machine applications. The card dispensing processor 251 can transmit control signals to, and exchange data with, the carriage controller 240 and the card data processor 242 in response to signals received from a central computer 250 (shown schematically in FIG. 2A). As described in greater detail below, the card dispensing processor 251 can also receive signals from one or more payment features configured to receive payment for a card, such as a bill acceptor and/or a card reader (e.g., a credit or debit card reader).

The central computer 250 can be a main computer controlling the overall functions of a particular card vending machine, kiosk, or other structure in which the card dispensing apparatus 200 is housed. For example, in one embodiment, the central computer 250 can receive user instructions, such as card selections and payment choices, via a user interface 252 (also shown schematically in FIG. 2A). As will be explained in greater detail below, such user interfaces can include a keypad, display screen, touch screen, and/or various user selection buttons. In another embodiment, the central computer 250 can enable modem connections to remote computers in a computer network. Such connections can facilitate the exchange of data, such as card purchase and/or card account data, with one or more of the remote computers.

The present invention is not limited to the foregoing arrangement of processors and controllers. For example, in an alternate embodiment, the card dispensing processor 251 can be omitted. In this embodiment, the central computer 250 can transmit control signals directly to, and exchange data directly with, the carriage controller 240 and the card data processor 242 to control the functions of the card dispensing apparatus 200.

Figure 3:
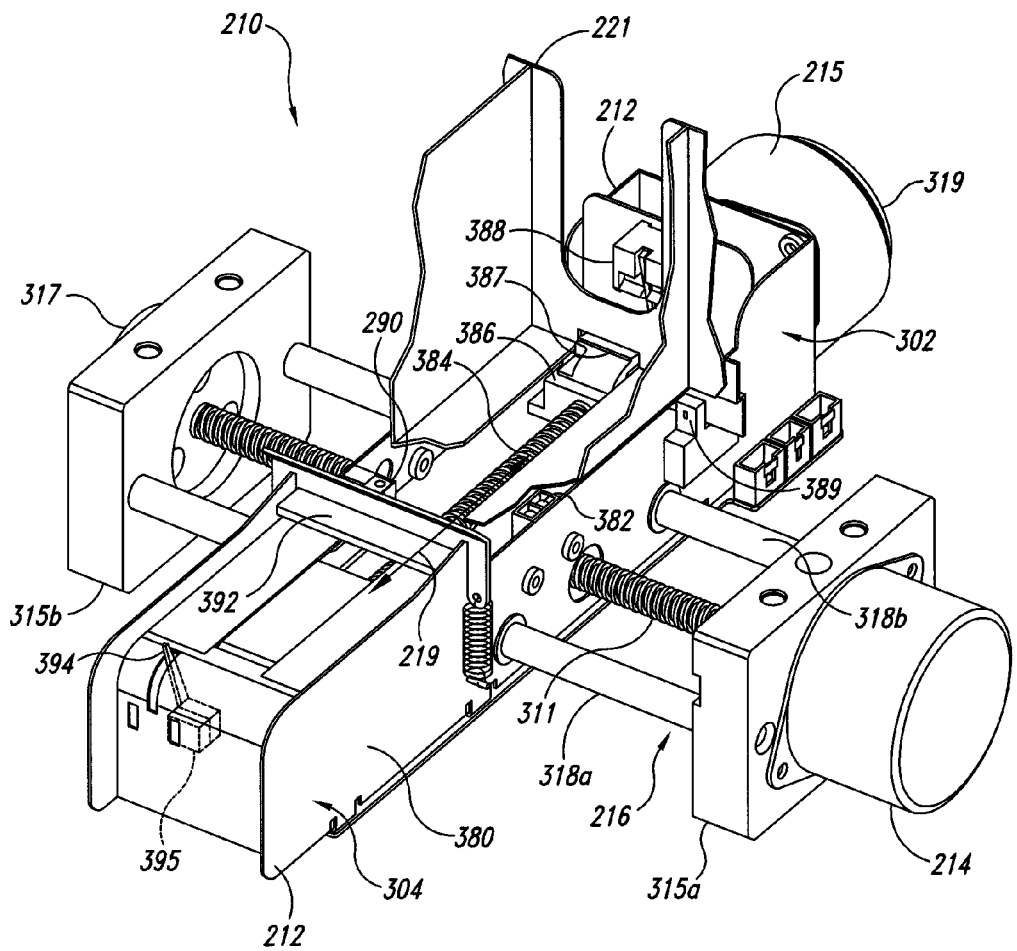
FIG. 3 is an enlarged front isometric view of a carriage assembly configured in accordance with an embodiment of the invention.

FIG. 3 is an enlarged front isometric view of the carriage assembly 210 of FIG. 2 configured in accordance with an embodiment of the invention. A cutaway portion of the card hopper 221b is also shown in FIG. 3 for purposes of illustration. In one aspect of this embodiment, the carriage track 216 includes first and second elongate guide rods 318a, 318b extending between first and second support blocks 315a, 315b. The first stepper motor 214 can be fixedly attached to the first support block 315a and can selectively rotate a first lead screw 311 both clockwise and counter-clockwise about its axis. The first lead screw 311 can be threadably engaged with the card carriage 212 such that rotation of the first lead screw 311 in one direction causes the card carriage 212 to move to the left on the guide rods 318, and rotation of the first lead screw 311 in the opposite direction causes the card carriage 212 to move to the right on the guide rods 318. A first hand-wheel 317 can be fixedly attached to a distal end of the first lead screw 311 adjacent to the second support block 315b for manual movement of the card carriage 212 on the guide rods 318. Such manual movement may be desired during cleaning or inspection of the carriage assembly 210.

In another aspect of this embodiment, the card carriage 212 includes a carriage body 380 having a card loading end 302 and a card dispensing end 304. The second stepper motor 215 can be fixedly attached to the card loading end 302 of the carriage body 380, and a second lead screw 384 can extend from the second stepper motor 215 through the carriage body 380. A card selector 386 can be threadably engaged with the second lead screw 384 such that rotation of the second lead screw 384 about its axis by the second stepper motor 215 causes the card selector 386 to move fore and aft on the second lead screw 384. A second hand-wheel 319, similar to the first hand-wheel 317, can be fixedly attached to a proximal end of the second lead screw 384 outboard of the second stepper motor 215 for manual movement of the card selector 386.

As described in greater detail below, the card selector 386 can include a raised portion or other card engagement feature 387. The card engagement feature 387 is configured to catch an aft edge of a bottom-most card in the adjacent card hopper 221 as the card selector 386 moves forward on the second lead screw 384 from its home position, as shown in FIG. 3. As the card selector 386 moves forward, it pushes the bottom-most card out of the card hopper 221 and toward the card dispensing end 304 of the carriage body 380.

In a further aspect of this embodiment, the card carriage 212 also includes a spring-loaded card press 392 that presses cards toward the card reader/writer 290 as they move forward toward the card dispensing end 304 of the carriage body 380. This pressure can ensure that sufficient closeness is maintained between the card reader/writer 290 and a recording media fixed to the cards (e.g., a magnetic stripe or memory chip) so that information can be accurately read from, and accurately written to, the recording media.

In yet another aspect of this embodiment, the card carriage 212 further includes a card exit sensor 395 mounted toward the card dispensing end 304 of the carriage body 380. The card exit sensor 395 can include a sensor arm 394 extending movably upward into the card path. When struck by a card moving along the second axis 219, the sensor arm 394 pivots downwardly under the weight of the card, signaling the presence of the card on the card dispensing end 304 of the carriage body 380. As described in greater detail below, this signal can be transmitted via the card exit sensor 395 of the card dispensing processor 251 (FIG. 2A). In response to this signal, the card dispensing processor 251 can temporarily halt the card selector 386, pending the decision of whether to dispense the card into the card outlet chute 271 or the card escrow chute 272 (FIG. 2A). Although the card exit sensor 395 of the illustrated embodiment includes a mechanical switch (i.e., the sensor arm 394), in other embodiments, other types of sensors (e.g., light sensors) can be utilized to indicate the presence of a card on the card dispensing end 304 of the carriage body 380.

In addition to the forgoing features, the card carriage 212 can further include a carriage position sensor 389, a card selector position sensor 388, and a hopper empty sensor 382. The hopper empty sensor 382 can be mounted to one side of the carriage body 380 and directed upwardly into the adjacent card hopper 221. Similar to the card level sensors 222 described above with reference to FIG. 2A, the hopper empty sensor 382 can transmit a signal to the card dispensing processor 251 (FIG. 2A) when the adjacent card hopper 221 is empty. The card dispensing processor 251 can then transmit an appropriate message to an operator of the card dispensing apparatus 200 notifying the operator of the empty card hopper 221. The card selector position sensor 388 can be mounted toward the card loading end 302 of the carriage body 380 and can sense when the card selector 386 is in its home position. "Home" for the card selector 386 is when the card selector 386 is fully retracted back toward the second stepper motor 215, as shown in FIG. 3. The carriage position sensor 389 can be mounted to one side of the carriage body 380 and can be used to accurately position the card carriage 212 with respect to the individual card hoppers 221 (FIG. 2A) for card removal. For example, in one embodiment, the carriage position sensor 389 can include a light sensor that aligns with slots or other apertures in the card hopper assembly 220 when the card carriage 212 is properly aligned relative to a particular card hopper 221. Although the foregoing discussion describes certain types of sensors and sensor mounting positions, in other embodiments, other types of sensors and other mounting positions can be used without departing from the spirit or scope of the present disclosure.

Figure 4A:
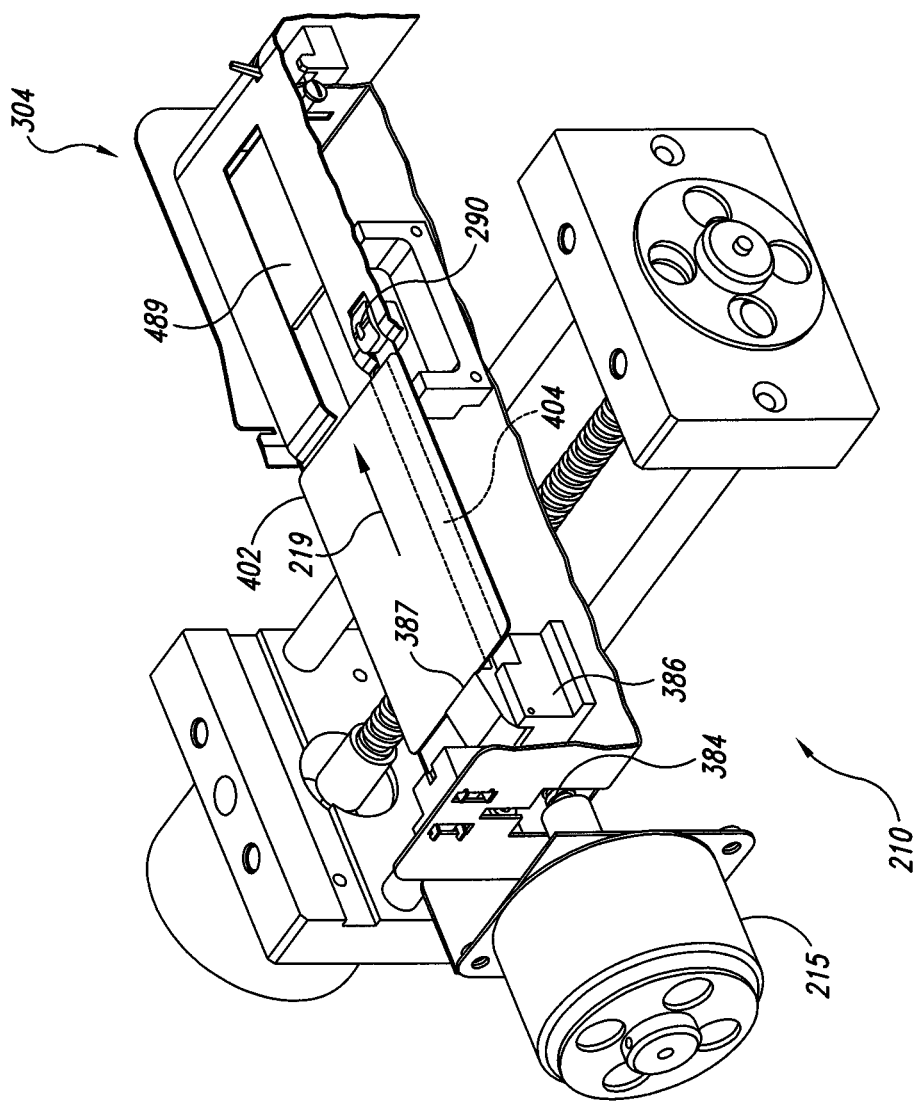
FIGS. 4A-C are partially cutaway rear isometric views of the carriage assembly of FIG. 3 illustrating a card dispensing sequence in accordance with an embodiment of the invention.
Figure 4B:
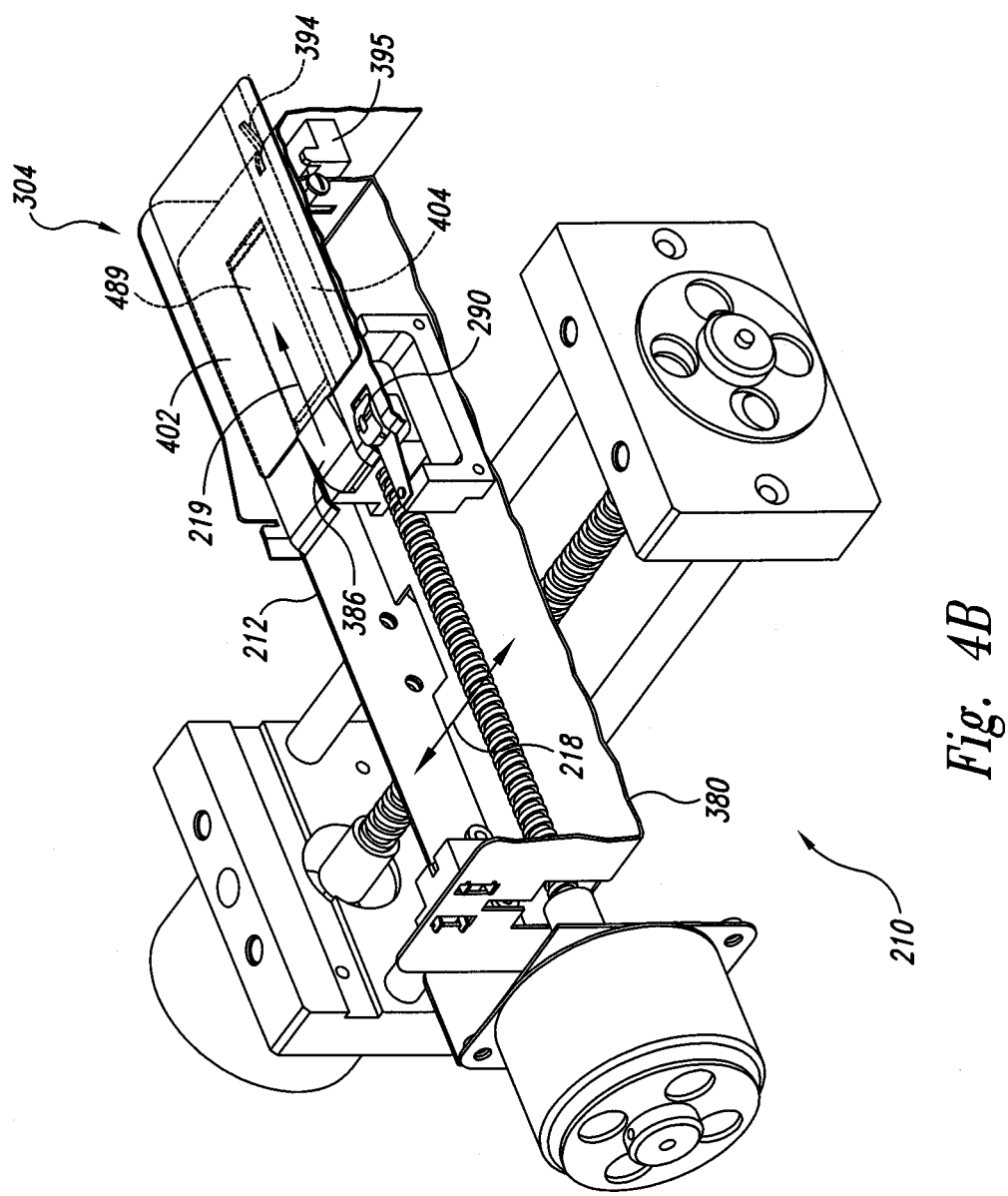
Figure 4C:
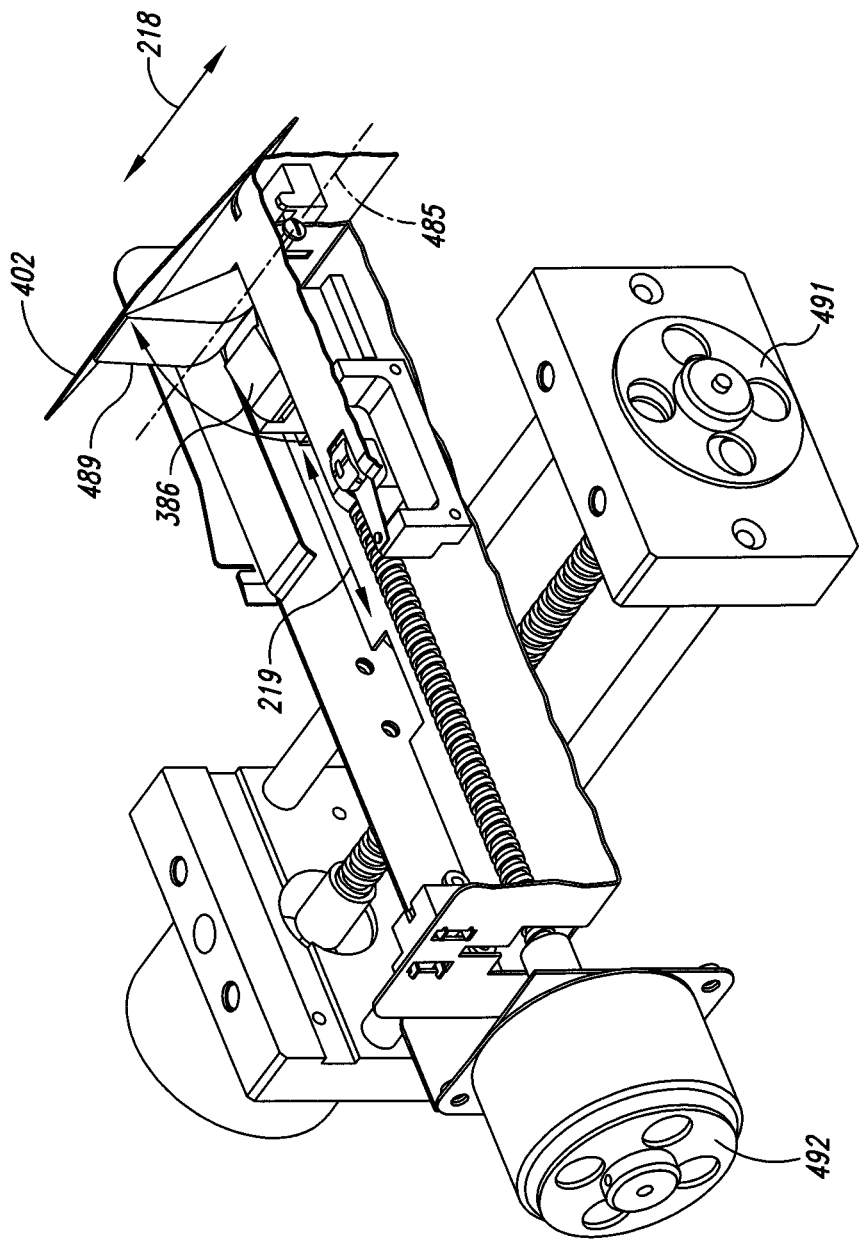

FIGS. 4A-C are partially hidden and cutaway rear isometric views of the carriage assembly 210 of FIG. 3 for the purpose of illustrating a card dispensing sequence in accordance with an embodiment of the invention. The card hopper assembly 220, the card press 392, and the card chute assembly 270 (FIGS. 2A-3) would normally be present during such a sequence but are not shown in FIGS. 4A-C for purposes of clarity. Referring first to FIG. 4A, the sequence begins when the card carriage 212 is properly positioned beneath one of the card hoppers 221 (FIGS. 2A, B). From this position, the second stepper motor 215 rotates the second lead screw 384, causing the card selector 386 to move forward from its home position along the second axis 219. After a short distance, the card engagement feature 387 contacts an aft edge of a card 402 and pushes the card 402 toward the card reader/writer 290. In one aspect of this embodiment, the card reader/writer 290 is positioned in at least general alignment with a fixed media 404 (e.g., a magnetic stripe, IC chip, or bar code) facing downward from the card 402. The card reader/writer 290 can be configured to either read data from the fixed media 404 or write data to the fixed media 404 as the card 402 moves over the card reader/writer 290. After moving over the card reader/writer 290, the card 402 proceeds forward toward a card ejector 489 positioned on the card dispensing end 304 of the carriage body 380.

Referring next to FIG. 4B, while moving onto the card ejector 489, a forward edge of the card 402 contacts the sensor arm 394 and rotates the sensor arm 394 downwardly. This movement causes the card exit sensor 395 to transmit a signal to the card dispensing processor 251 via the carriage controller 240 (FIG. 2A). This signal tells the card dispensing processor 251 that the card 402 is present on the card dispensing end 304 of the carriage body 380. In response to the signal, the carriage controller 240 causes the card selector 386 to stop moving forward along the second axis 219. As a result, the card 402 temporarily stops on the card dispensing end 304 of the carriage body 380 in the position shown in FIG. 4B. The card dispensing processor 251 then determines via the card data processor 242 (FIG. 2A) whether the fixed media 404 was sufficiently read (or written to) as the card 402 moved over the card reader/writer 290. In this context, the phrase "sufficiently read" means that the pertinent data (e.g., an account number and/or a value) contained on the fixed media 404 (e.g., a magnetic stripe) was fully acquired by the card data processor 242. Similarly, the phrase "sufficiently written to" means that such data was fully transferred to the fixed media 404 (e.g., a memory chip) by the card data processor 242.

If the fixed media 404 was sufficiently read (or written to), then the card carriage 212 moves along the first axis 218 to position itself above the card outlet chute 271 (FIG. 2A) so that the card 402 can be dispensed to a purchasing customer. If, however, the card 402 was not sufficiently read or written to, then the card carriage 212 moves into position above the card escrow chute 272 (FIG. 2A) so that the card 402 can be dropped into the escrow bin 276 and not dispensed to the customer. This card checking feature ensures that only cards that have been properly read or properly written to (i.e., only usable cards) are dispensed to customers. Accordingly, this feature saves customers from the trouble of having to return invalid or unusable cards to the operator of the associated vending machine for reimbursement.

Referring now to FIG. 4C, once the card carriage 212 is in position above the appropriate card chute (i.e., either the card outlet chute 271 or the card escrow chute 272), the card selector 386 proceeds forward along the second axis 219, causing the card ejector 489 to rotate upwardly about a pivot axis 485. This motion causes the card 402 to rotate upwardly off of the card carriage 212 and fall into the appropriate card chute. Once the card 402 has fallen, the card selector 386 moves back along the second axis 219 to its home position, and the card carriage 212 translates back along the first axis 218 to its home position. In a further aspect of this embodiment, the "home" position of the card carriage 212 is a position that is not aligned with any of the card hoppers 221 or either of the card chutes 271 or 272. Parking the card carriage 212 in such a home position may provide certain security advantages by preventing direct access to the card hoppers 221 via one of the card chutes 271 or 272 when the card dispensing apparatus 200 is not in use.

Figure 5A:
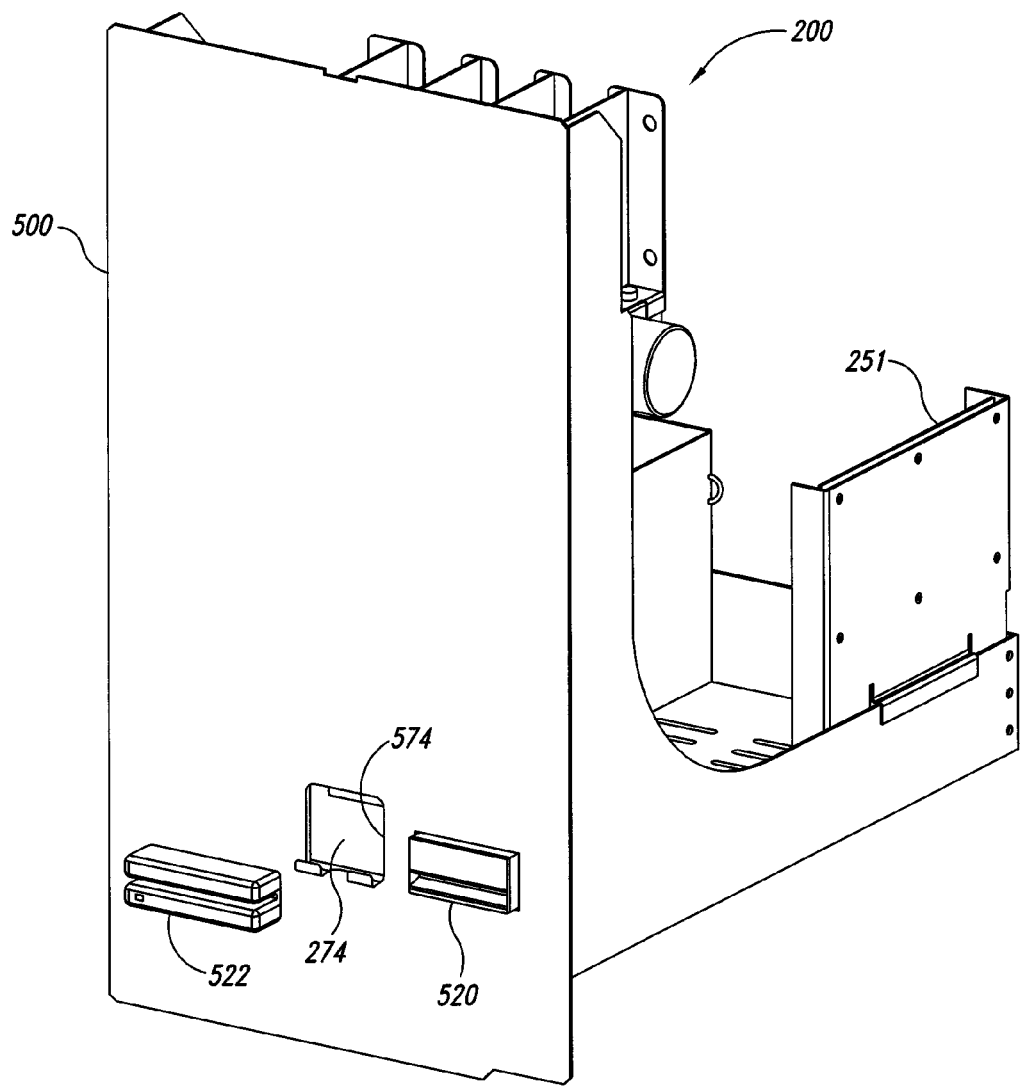
FIGS. 5A and 5B are front and rear isometric views, respectively, of a card vending machine drawer assembly configured in accordance with an embodiment of the invention.
Figure 5B:
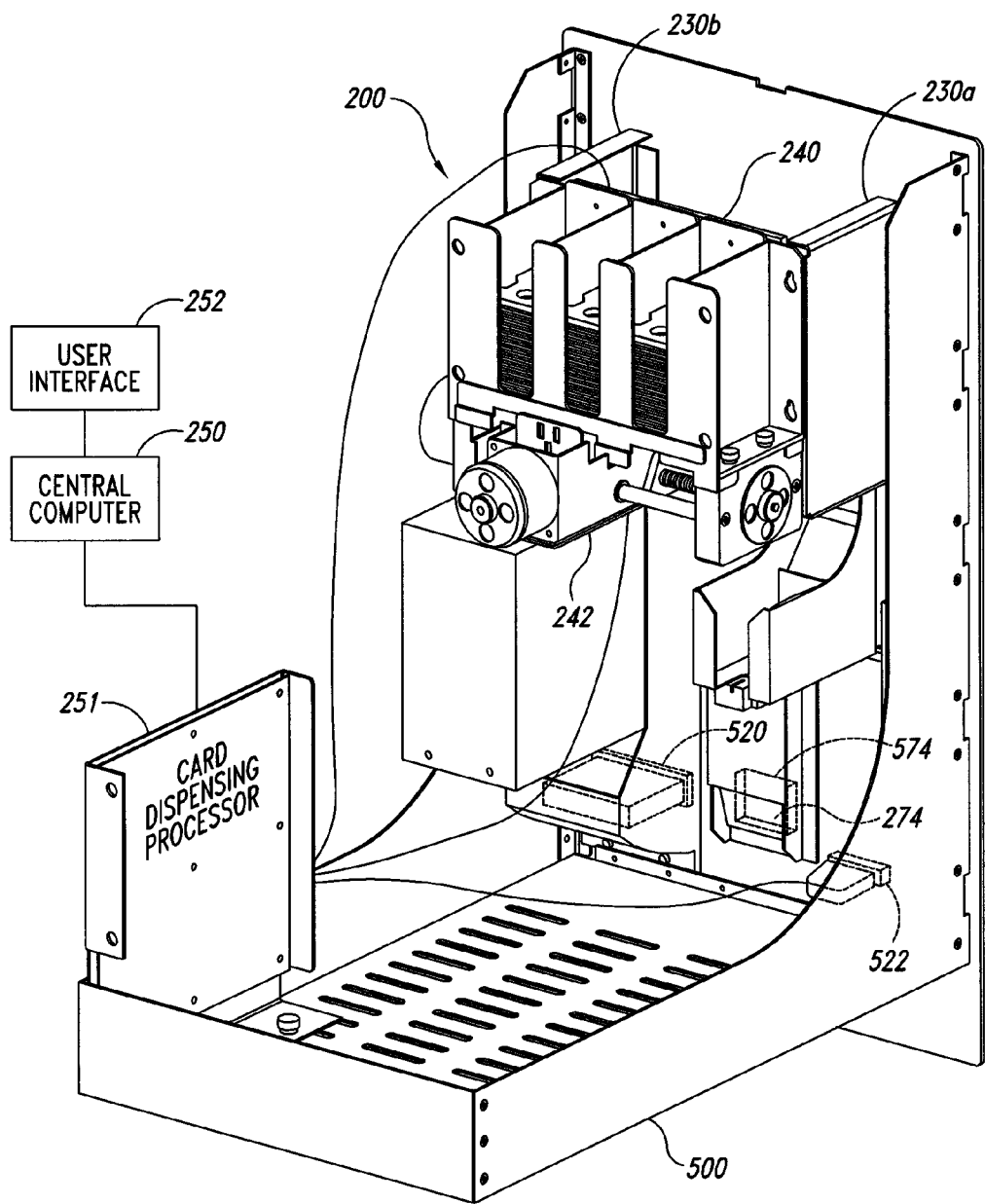

FIGS. 5A and 5B are front and rear isometric views, respectively, of the card dispensing apparatus 200 of FIGS. 2A, B mounted to a drawer assembly 500 in accordance with an embodiment of the invention. In one aspect of this embodiment, the card-dispensing apparatus 200 is mounted to the drawer assembly 500 with the mounting brackets 230 described above with reference to FIGS. 2A, B. The drawer assembly 500 can include one or more structural features for suitably mounting the drawer assembly 500 to a kiosk, coin-counting machine, card vending machine, or other enclosure from which cards are sold or otherwise distributed to users. Referring first to FIG. 5A, in one aspect of this embodiment, the drawer assembly 500 can include one or more features for receiving funds from a user to purchase a card dispensed by the card dispensing apparatus 200. For example, the drawer assembly 500 can include a card reader 522 and a bill acceptor 520. The card reader 522 can be configured to read a conventional credit card, debit card, ATM card, or the like when they are swiped through the card reader 522 by a user. The bill acceptor 520 can be configured to receive paper money from the user. In another aspect of this embodiment, the drawer assembly 500 further includes an opening 574 positioned to receive cards from the card outlet 274 for distribution to users.

Referring next to FIG. 5B, in another aspect of this embodiment, the card dispensing processor 251 can be mounted to an aft portion of the drawer assembly 500 and can control all functions associated with the card dispensing apparatus 200 via connections to the carriage controller 240, the card data processor 242, the card reader 522, and the bill acceptor 520. As explained above, the card dispensing processor 251 can receive instructions from the user interface 252 and other sources via the central computer 250 (shown schematically in FIG. 5B).

Figure 6:
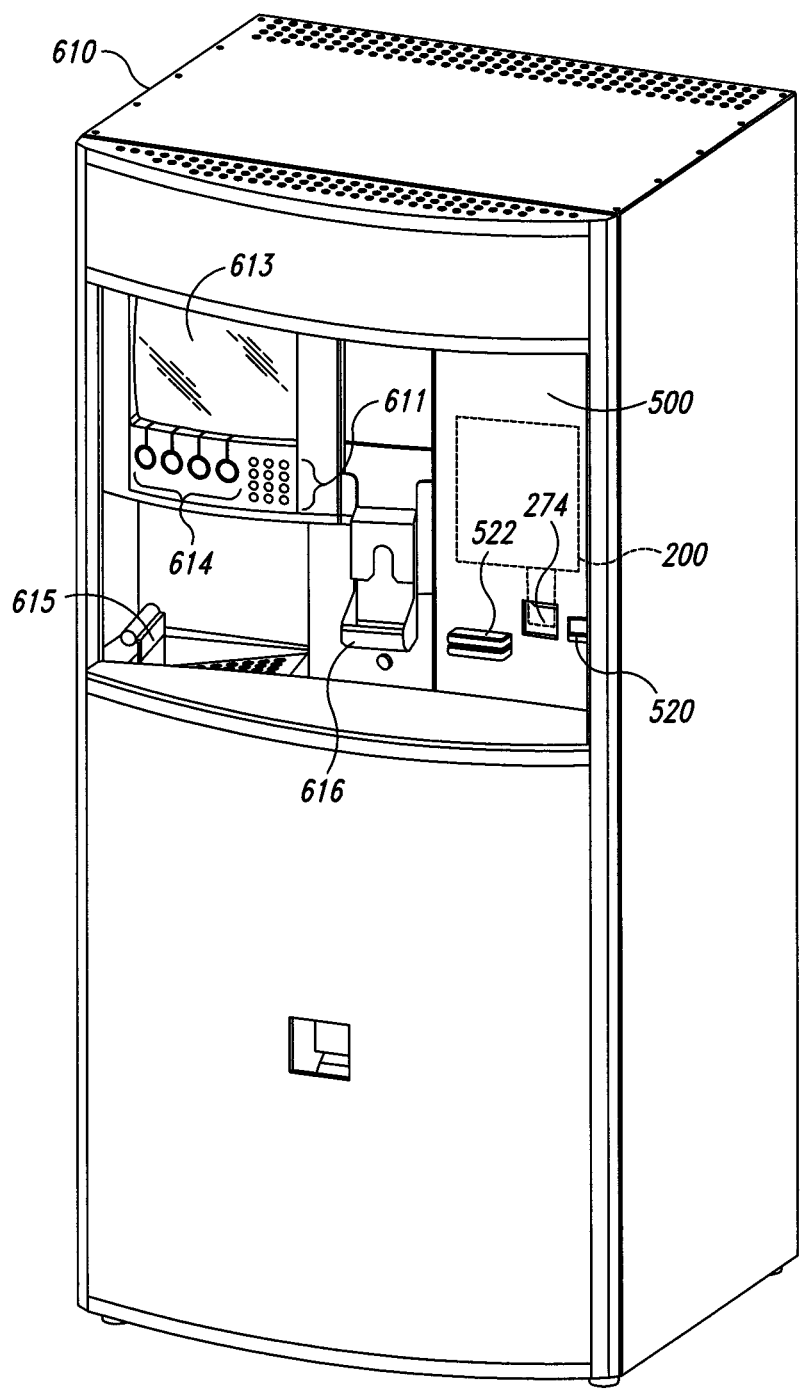
FIG. 6 is a front isometric view of a card vending machine with the drawer assembly of FIGS. 5A and 5B configured in accordance with an embodiment of the invention.

FIG. 6 is a front isometric view of a card vending machine 610 that includes the drawer assembly 500 of FIG. 5 in accordance with an embodiment of the invention. In one aspect of this embodiment, the vending machine 610 can include features at least generally similar in structure and function to features of the coin-counting machines described in U.S. Pat. No. 6,494,776 to Molbak ("Molbak"), which is incorporated herein in its entirety by reference. In other embodiments, however, various features of the vending machine 610 can differ from the coin-counting machines described in Molbak, depending on the particular application. In another aspect of this embodiment, the vending machine 610 includes a display screen 613, user selection buttons 614, and a keypad 611. The display screen 613 can display various user instructions and prompts explaining how to purchase cards and/or perform other functions with the machine 610. The user selection buttons 614 can include, for example, various options for responding to the prompts and selecting a desired type of card or a desired method of payment. Similarly, the keypad 611 can allow the user to input various alphanumeric information, such as account numbers and/or monetary values, related to the card purchase transaction.

In a further aspect of this embodiment, the machine 610 includes a coin input region or tray 615 configured to receive a plurality of coins from a user for counting. In one embodiment, the user can elect to receive a redeemable voucher via a voucher outlet 616 for a value related to the total amount of coins counted. In another embodiment, the user can elect to pay for a card (such as a prepaid credit card or phone card) with coins as an alternative to paying for the card with a credit card via the card reader 522 or with paper currency via the bill acceptor 520.

In one aspect of this embodiment, a user desiring to purchase a card from the vending machine 610 may do so by first reading the card purchase instructions and prompts displayed on the display screen 613. (Alternatively, the instructions can be provided on the front or side of the machine 610, along with product advertising.) By using the user selection buttons 614 and/or the keypad 611 to respond to the prompts, the user can select a particular type of card (e.g., a prepaid credit card or phone card) and a particular card value. In one embodiment, the available card values (e.g., the amount of money or long-distance minutes associated with a card) may be predefined such that the user must choose from a limited number of options. In other embodiments, the value may be variable such that the user may be able to define the card value. In either embodiment, the user then enters payment (e.g., via the coin input tray 615, the card reader 522, and/or the bill acceptor 520) sufficient to cover the cost of the selected card. Once the vending machine 610 confirms the receipt of payment, the card dispensing apparatus 200 dispenses the desired card with the desired value to the user via the card outlet 274. As mentioned above, in one embodiment, the vending machine 610 can be networked via the central computer 250 (FIG. 2A) to other card vending machines and remote computer systems to exchange information related to card purchases. Such information can include, for example, bank and credit card account information, in addition to long-distance calling card account information.

Figure 7:
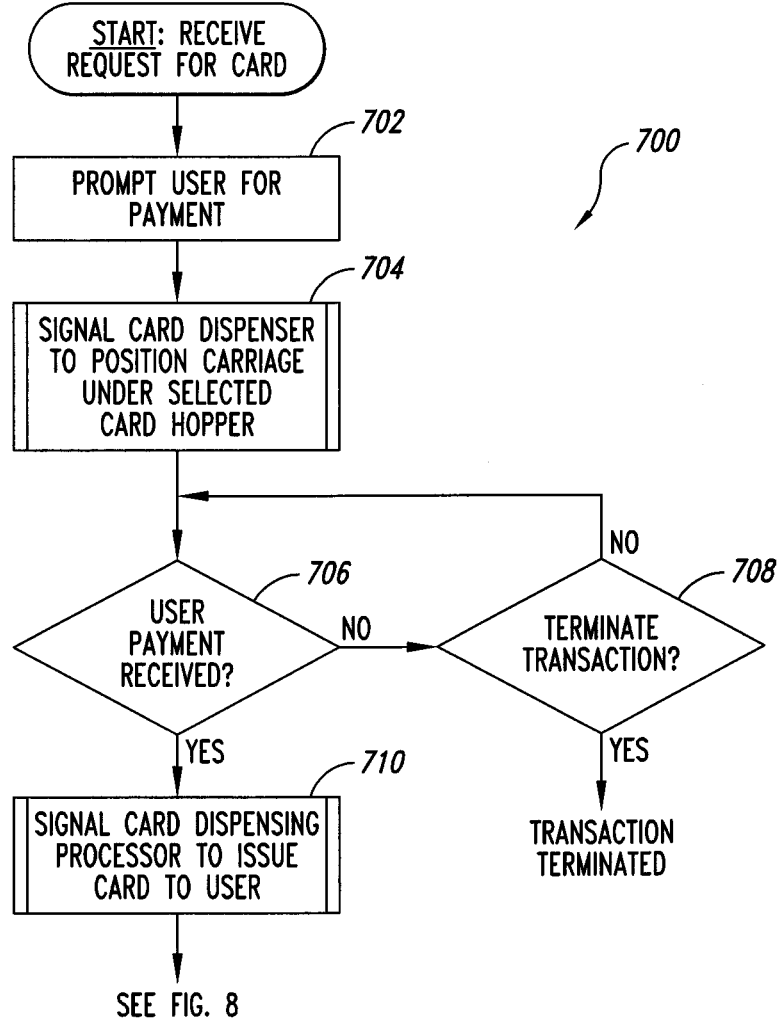
FIG. 7 is a flow diagram illustrating a routine for dispensing a card in accordance with an embodiment of the invention.

FIG. 7 is a flow diagram illustrating a routine 700 for dispensing a selected card to a user with the card dispensing apparatus 200 of FIGS. 2A, B in accordance with an embodiment of the invention. In one aspect of this embodiment, the routine 700 can be carried out by the central computer 250 (FIG. 2A) according to computer-executable instructions stored on a computer-readable medium, such as a floppy disk or CD-ROM. The routine 700 starts when the central computer 250 receives a request for a particular type of card. This request may come via the user interface 252 (FIG. 2A) which, as described above, can include a keypad, touch screen, and/or other user selection buttons. In response to the card request, in block 702, the routine 700 prompts the user for payment for the card. In another aspect of this embodiment, such payment can include cash received in the form of coins or bills, and/or credit received in the form of a credit card account number. In other embodiments, cards can be purchased using other forms of payment, including prepayment from a remote computer via a computer network or an associated web site.

In block 704, the routine 700 signals the card dispensing processor 251 to position the card carriage 212 under the particular card hopper 221 (FIG. 2A) that contains the desired card. In decision block 706, the routine 700 determines if payment for the card has been received from the user. If payment has not been received, then in decision block 708 the routine 700 determines if the transaction should be terminated. In one embodiment, the routine 700 can elect to terminate the transaction based on the amount of time that has elapsed without receiving payment from the user. In other embodiments, termination can be based on other factors, such as user termination input or lack of a user response to an appropriate prompt. If, however, the routine 700 determines that the transaction should not be terminated, then the routine 700 can continue to wait for user payment or it can reprompt the user for payment. Once the routine 700 confirms that user payment has been received, then in block 710 the routine 700 signals the card dispensing processor 251 to issue the selected card to the user.

Figure 8:
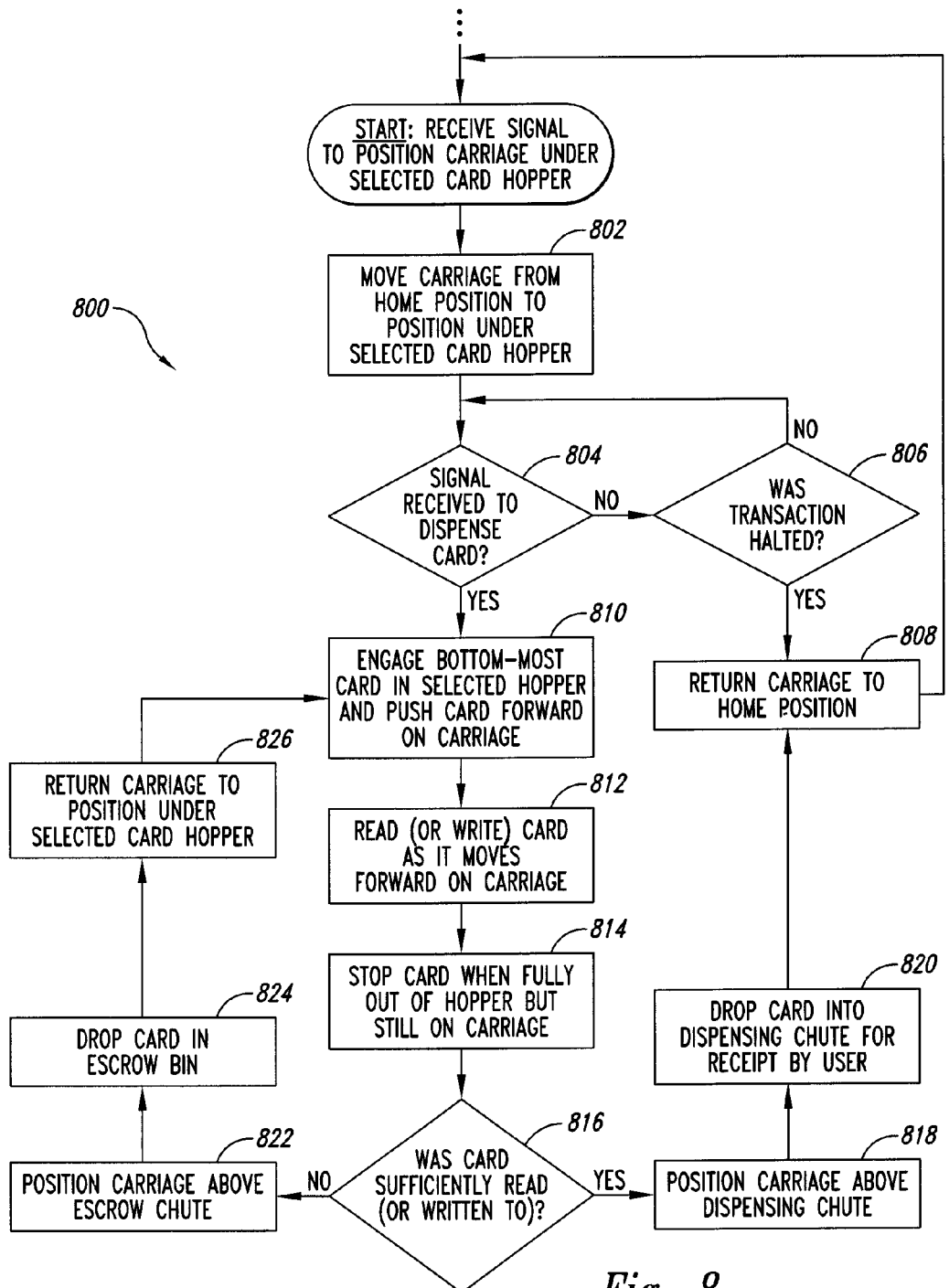
FIG. 8 is a flow diagram illustrating a routine for dispensing a card in accordance with another embodiment of the invention.

FIG. 8 is a flow diagram illustrating a routine 800 for dispensing a selected card to a user with the card dispensing apparatus 200 of FIG. 2A, B in accordance with another embodiment of the invention. The routine 800 starts when the card dispensing processor 251 receives an instruction from the central computer 250 to position the card carriage 212 under the particular card hopper 221 that contains the desired card type. In response to the instruction, in block 802, the card dispensing processor 251 (via the carriage controller 240) moves the card carriage 212 from its home position to a position beneath the appropriate card hopper 221.

After the card carriage 212 has been positioned beneath the appropriate card hopper 221, in decision block 804 the routine 800 determines if it has received a signal to dispense the desired card. If such a signal has not been received, then in decision block 806 the routine 800 determines if the transaction has been halted. As explained above, in one embodiment, the transaction may be halted by the user or the transaction may be halted automatically because the user has failed to deposit sufficient funds within a set period of time. Either way, if the transaction has been halted, then in block 808 the card carriage 212 returns to its home position. If the transaction has not been halted, then the routine 800 continues to wait for a signal to dispense the desired card. Once the routine 800 receives the signal to dispense the desired card, in block 810 the card carriage 212 engages the bottom-most card in the card hopper 221 and pushes the card forward out of the card hopper 221. In block 812, the card reader/writer 290 reads the information stored on the card (or, alternatively, writes information to the card) as the card moves forward on the card carriage 212. In block 814, the card selector 386 (FIG. 3) stops once the card has been fully read (or written to), but while the card is still positioned on the card dispensing end 304 (FIG. 3) of the card carriage 212. In decision block 816, the routine 800 determines if the card was sufficiently read (or written to) as it moved over the card reader/writer 290.

If the card was not sufficiently read (or written to), then in block 822 the card carriage 212 moves into position above the card escrow chute 272 and, in block 824, drops the card into the card escrow chute 272 where it falls into the card escrow bin 276. In block 826, the card carriage 212 then returns to the appropriate card hopper 221 and repeats the sequence of blocks 810, 812, and 814 to remove a fresh card from the card hopper 221. Accordingly, the routine 800 can repeat the foregoing card removal sequence until a card that is suitable for distribution to the user has been extracted from the appropriate card hopper 221.

Returning to decision block 816, if the card was sufficiently read (or written to), then in block 818 the card carriage 212 moves into position above the card outlet chute 271. In block 820, the card carriage 212 drops the card into the card outlet chute 271, where it falls to the card outlet 274 for pickup by the user. In block 808, the card carriage 212 returns to its home position and the routine is complete.

The foregoing description of embodiments of the invention is not intended to be exhaustive or to limit the invention to the precise embodiments disclosed. While specific embodiments of, and examples for, the invention are described herein for illustrative purposes, various equivalent modifications are possible within the scope of the invention, as those of ordinary skill in the relevant art will recognize. For example, although certain functions may be described in the present disclosure in a particular order, in alternate embodiments these functions can be performed in a different order or substantially concurrently, without departing from the spirit or scope of the present disclosure. In addition, the teachings of the present disclosure can be applied to other systems, not only the representative card vending systems described herein. Further, various aspects of the invention described herein can be combined to provide yet other embodiments.

All of the references cited herein are incorporated in their entireties by reference. Accordingly, aspects of the invention can be modified, if necessary or desirable, to employ the systems, functions, and concepts of the cited references to provide yet further embodiments of the invention. These and other changes can be made to the invention in light of the above-detailed description. In general, the terms used in the following claims should not be construed to limit the invention to the specific embodiments disclosed in the specification, unless the above-detailed description explicitly defines such terms. Accordingly, the actual scope of the invention encompasses the disclosed embodiments and all equivalent ways of practicing or implementing the invention under the claims.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below," and words of similar import, when used in this application, shall refer to this application as a whole and not to any particular portions of this application. When the claims use the word "or" in reference to a list of two or more items, that word covers all of the following interpretations of the word: any of the items in the list, all of the items in the list, and any combination of the items in the list.

While certain aspects of the invention are presented below in certain claim forms, the inventors contemplate the various aspects of the invention in any number of claim forms. Accordingly, the inventors reserve the right to add claims after filing the application to pursue such additional claim forms for other aspects of the invention. Accordingly, the scope of the present invention is not limited, except by the appended claims.

We claim:

1. A card dispensing apparatus comprising:
a first card hopper configured to hold a first plurality of cards in a first vertical stack;
at least a second card hopper configured to hold a second plurality of cards in a second vertical stack;
a card carriage selectively movable between a first position proximate to the first card hopper and at least a second position proximate to the second card hopper, wherein the card carriage is configured to receive at least a first card from the first vertical stack when the card carriage is in the first position, and wherein the card carriage is further configured to receive at least a second card from the second vertical stack when the card carriage is in the second position;
a card outlet; and
a card escrow bin, wherein the card carriage is configured to transfer at least one of the first and second cards to the card outlet when the card carriage is in a third position, and wherein the card carriage is further configured to transfer at least one of the first and second cards to the card escrow bin when the card carriage is in a fourth position, different than the third position.

2. The apparatus of claim 1, further comprising a card outlet passage in communication with the card outlet, wherein the card carriage is further configured to transfer at least one of the first and second cards to the card outlet passage for transfer to the card outlet.

3. The apparatus of claim 1 wherein the third position is offset from the first and second positions.

4. The apparatus of claim 1 wherein the card outlet is at least generally accessible to a user of a vending machine when the first and second card hoppers are enclosed within the vending machine, and wherein the card escrow bin is at least generally inaccessible to the user of the vending machine when the first and second card hoppers are enclosed within the vending machine.

5. The apparatus of claim 1, further comprising a card reader positionable proximate to the card carriage, wherein the card reader is configured to read information from at least one of the first and second cards.

6. The apparatus of claim 5 wherein the card reader is configured to read information from a magnetic stripe formed on the at least one of the first and second cards.

7. The apparatus of claim 1 wherein the card carriage includes a carriage body and a card selector movably supported by the carriage body, wherein the card selector is configured to remove at least the first card from the first card hopper when the card carriage is in the first position, and wherein the card selector is further configured to remove at least the second card from the second card hopper when the card carriage is in the second position.

8. A card dispensing apparatus comprising:
a first card hopper configured to hold a first plurality of cards in a first vertical stack;
at least a second card hopper configured to hold a second plurality of cards in a second vertical stack;
a card outlet for dispensing acceptable cards;
a card escrow bin for holding unacceptable cards; and
a card carriage selectively movable between a first position proximate to the first card hopper, a second position proximate to the second card hopper, a third position spaced apart from the first and second positions, and a fourth position spaced apart from the third position, wherein the card carriage is configured to receive at least a first card from the first vertical stack when the card carriage is in the first position, wherein the card carriage is configured to receive at least a second card from the second vertical stack when the card carriage is in the second position, and wherein the card carriage is further configured to optionally transfer the first and second cards to the card outlet when the card carriage is in the third position and to the card escrow bin when the card carriage is in the fourth position.

9. The card dispensing apparatus of claim 8, further comprising a card reader configured to read information from at least the first card, wherein the card carriage is configured to move to the third position and transfer the first card to the card outlet when the card reader has sufficiently read the information from the first card, and wherein the card carriage is further configured to move to the fourth position and transfer the first card to the card escrow bin when the card reader has insufficiently read the information from the first card.

10. The card dispensing apparatus of claim 8, further comprising a card reader affixed to the card carriage, wherein the card reader is configured to read information from at least the first card, wherein the card carriage is configured to move to the third position and transfer the first card to the card outlet when the card reader has sufficiently read the information from the first card, and wherein the card carriage is further configured to move to the fourth position and transfer the first card to the card escrow bin when the card reader has insufficiently read the information from the first card.

11. The card dispensing apparatus of claim 8 wherein the card carriage includes a carriage body and a card selector movably supported by the carriage body, wherein the card selector is configured to remove at least the first card from the first card hopper when the card carriage is in the first position, wherein the card selector is further configured to remove at least the second card from the second card hopper when the card carriage is in the second position, and wherein the first card is the bottom-most card in the first vertical stack and the second card is the bottom-most card in the second vertical stack.

12. The card dispensing apparatus of claim 8 wherein the card carriage is positioned below the first and second card hoppers and is configured to move laterally between the first, second, third, and fourth positions.

13. The card dispensing apparatus of claim 8 wherein the card carriage is configured to move back and forth beneath the first and second card hoppers in a first direction, wherein the card carriage includes a card selector movably supported by a carriage body, wherein the card selector is configured to move in a second direction perpendicular to the first direction to remove at least the first card from the first card hopper when the card carriage is in the first position, and wherein the card selector is further configured to move in the second direction to remove at least the second card from the second card hopper when the card carriage is in the second position.

* * * * *